United States Patent

Moran

[11] 4,195,221
[45] Mar. 25, 1980

[54] SCANNING FOCUSED LOCAL OSCILLATOR OPTICAL HETERODYNE IMAGING SYSTEM

[75] Inventor: Steven E. Moran, Lakeside, Calif.

[73] Assignee: The United States of America as represented by the Secretary of the Navy, Washington, D.C.

[21] Appl. No.: 921,663

[22] Filed: Jul. 3, 1978

[51] Int. Cl.² .................................. H04N 7/18
[52] U.S. Cl. ........................ 455/609; 356/349; 358/90; 358/95
[58] Field of Search ............ 358/90, 41, 209, 212, 358/95; 250/199; 350/3.67; 356/349, 360; 313/381

[56] References Cited

U.S. PATENT DOCUMENTS

| | | | |
|---|---|---|---|
| 2,337,578 | 12/1943 | Teal | 313/381 |
| 2,541,374 | 2/1951 | Morton | 313/381 |
| 3,426,207 | 2/1969 | Fried et al. | 250/199 |
| 3,445,588 | 5/1969 | Nicholson | 358/95 |
| 3,544,795 | 12/1971 | Korpel | 250/199 |
| 3,566,021 | 2/1971 | Jakes, Jr. | 250/199 |
| 3,670,098 | 6/1972 | Korpel | 356/349 |
| 3,856,988 | 12/1974 | Funk | 358/95 |
| 3,868,658 | 2/1975 | Kiemle | 356/349 |
| 4,030,831 | 6/1977 | Gowrinathan | 356/349 |

*Primary Examiner*—Robert L. Griffin
*Assistant Examiner*—Joseph A. Orsino, Jr.
*Attorney, Agent, or Firm*—Richard S. Sciascia; Ervin F. Johnston; James O. Skarsten

[57] ABSTRACT

In an optical heterodyne system a first coherent light signal is received upon an ordered array of light responsive elements, and a local oscillator source provides a second coherent light signal, the frequencies of the first and second coherent light signals being different. Mixing apparatus is provided to focus the second coherent light signal upon each of the light responsive elements of the array in a preselected sequence, and scanning apparatus scans the light responsive elements in the same preselected sequence to receive light responsive signals generated by the light responsive elements, each of the light responsive signals being related to the intensity of light impinging upon a different one of the light responsive elements and having a frequency equal to the difference between the frequencies of the first and second coherent light signals.

15 Claims, 2 Drawing Figures

SCANNING FOCUSED LOCAL OSCILLATOR OPTICAL HETERODYNE IMAGING SYSTEM

STATEMENT OF GOVERNMENT INTEREST

The invention described herein may be manufactured and used by or for the Government of the United States of America for governmental purposes without the payment of any royalties thereon and therefor.

BACKGROUND OF THE INVENTION

The invention disclosed and claimed herein pertains generally to an apparatus and method for optical heterodyning. More particularly, the invention pertains to an optical heterodyne system which provides an electrical representation of an image contained in the field or wavefront of a coherent light beam, such as the image of an object from which the beam has been reflected. Even more particularly, the invention pertains to an optical heterodyne system for visually observing an object by means of apparatus for, and the steps of receiving a first coherent light beam reflected from the object, heterodyning or mixing different discrete components of the first coherent light beam with a second coherent light beam of a different frequency, and receiving signals generated by the heterodyne process, each of the discrete components being mixed and each of the signals being received in the same preselected sequence.

In an optical heterodyne receiver system, a coherent light signal carrying information modulated thereupon is received by the system, and is mixed with a coherent local oscillator light signal of a different frequency to provide an optical heterodyne signal. The heterodyne signal, having a frequency equal to the difference between the frequencies of the received and local oscillator signals, is transduced by a photo-detector to an electrical heterodyne signal. The carried information is then extracted from the electrical signal by means of well known electrical communications apparatus.

In the construction of an optical heterodyne receiver of the above type, it is very important to consider the angular alignment between the wavefronts of the received and local oscillator signals at the photodetector. If the alignment is not within a critical limit, mixing efficiency will be so degraded that information carried by the received signal will be undetectable. In the past, this problem has been overcome by focusing the field, or wavefront, of the received information carrying signal within a diffraction-limited spot, or Airy disc, and illuminating the disc with the local oscillator signal. Mixing occurs within the disc, and the light within the disc, comprising the aforementioned optical heterodyne signal, is sensed by a photodetector to provide an electrical signal representing the optical heterodyne signal. The dimensions of the Airy disc are selected in respect to the wavelength of the received information carrying signal so that most of the received signal energy is concentrated therewithin. Consequently, even though the received and local oscillator signals are misaligned, mixing efficiency within the disc is sufficiently high to provide a detectable heterodyne signal.

The above technique is exemplified in U.S. Pat. No. 3,426,207, 1969, to D. F. Fried et al, which discloses the use of the photocathode of an image dissector tube as the required photodetector. The detector plane of the photocathode is illuminated with light of the local oscillator signal, and the information carrying signal is focused in an Airy disc upon a small area of the detector plane. A stream of electrons, representing the light impinging upon a specified section of the detector plane, is directed from the photocathode to an electron detector grid. In order to maximize signal-to-noise ratio, it is necessary to ensure that the Airy disc continuously falls within such section. However, due to atmospheric or other factors affecting the transmission of the information carrying signal, the Airy disc tends to "wander" or randomly move on the detector plane of the photocathode. Consequently, some kind of tracking means must be provided to continuously monitor the position of the disc on the detector plane so that the planar section from which electrons are received by the detector grid is always the section upon which the Airy disc impinges. Such tracking means has generally included fairly complex electronic circuitry.

In addition to introducing the problem of wander, the above technique would have little or no applicability in an optical heterodyne imaging system, which is intended to provide the image of an object by receiving a coherent light beam reflected from the object. For example, the image of an object from which a coherent light signal is reflected is contained within, or carried upon, the field or wavefront of the signal, and may be thought of as comprising an array of discrete picture elements, each picture element having a discrete light intensity and position in the image. In order to view the image, it would be necessary to detect the magnitude and position of each such picture element. However, the above technique makes no provision for such detection. In addition, if the above technique was used in an imaging application, the gain in mixing efficiency provided by focusing the received wavefront would be lost.

SUMMARY OF THE INVENTION

The invention disclosed and claimed herein provides an optical heterodyne system receiving a first coherent light signal of a given frequency, and includes a photosensitive planar surface for receiving an image contained in the field of the first coherent light signal, the image comprising an array of picture elements. The invention further includes a means for providing a second coherent light signal, the frequencies of the first and second coherent light signals being different. Means for mixing the second coherent light signal with the light of each of the picture elements of the image in a preselected sequence is provided to generate electric signals having a frequency equal to the difference between the frequencies of the first and second coherent light signals, each of the electric signals representing the light intensity of one of the picture elements. Means for receiving the electric signals are provided, and means cooperating with the mixing means directs each of the electric signals to the receiving means in the aforementioned preselected sequence to provide an electrical representation of the aforementioned image.

Preferably, the mixing means in the above system includes an array of light responsive elements, each of the light responsive elements generating one of the electric signals, and each of the light responsive elements having a light sensitive surface of selected area upon which one of the picture elements impinges. The light sensitive surfaces of the elements together comprise the photosensitive planar surface receiving the image. The mixing means preferably includes further an optical beam deflector for focusing the second coherent light signal within an Airy disc on the light sensitive surface of each of the light responsive elements in the aforementioned preselected sequence, the area of the Airy disc being substantially less than the area of each of the light sensitive surfaces.

In a preferred embodiment of the invention, each of the light responsive elements comprises an incremental section of the photocathode of an image dissector, the light sensitive surface of each light responsive element comprising an incremental section of the detector plane of the photocathode. Each light responsive element projects a stream of electrons into the drift tube of the image dissector, the stream of electrons from a given light responsive element representing the light intensity of a given picture element. The signal directing means includes a system of deflection coils positioned within the drift tube for directing the electron stream generated by each of the light responsive elements through an aperture of selected dimensions to the aforementioned signal receiving means. The receiving means includes an electron multiplier receiving each of the electron streams for multiplying the number of electrons in each stream by a selected factor to provide the aforementioned electrical representation of the image. The electrical representation may be coupled to standard electrical or electronic imaging apparatus, which responds thereto to provide the image of the object in a visually observable form.

Also in the preferred embodiment, the system includes means for directing the electron stream projected by a given light responsive element through the aperture when the second coherent light signal is focused upon the given light responsive element, the dimensions of the light sensitive surface of each of the light responsive elements being the same as the dimensions of the aperture. If the diameter of the aperture is approximately 200 microns, and the second coherent signal is focused onto a light sensitive surface of a light responsive element within an Airy disc of approximately 2 microns diameter, the ratio therebetween is 100:1. The aforementioned wander problem is thereby eliminated.

An optical heterodyne system of the above type may also be provided with a means for projecting coherent light of a selected frequency upon an object, a beam of the projected light being reflected back to the system and focused upon the planar surface to provide an image of the object. The projected light may be provided, for example, by a continuous wave laser source, and an optical frequency shifter, receiving some of the laser light, may be employed to provide the second coherent signal required for optical mixing as hereinbefore described.

It is anticipated that the invention disclosed herein may alternatively be claimed as a method for providing an electrical representation of an image contained in the field of a first coherent light beam, the method comprising the steps of: receiving the image upon a photosensitive planar surface, the image comprising an array of picture elements; providing a second coherent light signal, the frequencies of said first and second coherent light signals being different; mixing said second coherent light signal with the light of each of said picture elements in a preselected sequence to generate electric signals having a frequency equal to the difference between the frequencies of the first and second coherent light signals, each of the electric signals representing the light intensity of one of the picture elements; and, directing each electric signal provided by the mixing step to a signal receiving means, in the same preselected sequence, to provide an electrical representation of the image.

OBJECTS OF THE INVENTION

A primary object of the invention is to provide a system for viewing an image contained in the field or wavefront of a coherent light signal.

Another object is to provide an optical heterodyne system for viewing an image of an object.

Another object of the invention is to provide an electrical signal which represents an image contained in the wavefront of a coherent light signal.

Another object is to provide an improved optical heterodyne system, useful for both communications and imaging, which detects information contained in the wavefront of a received coherent light signal by sequentially mixing an optical local oscillator signal with the light of discrete picture elements of an image representing the information.

These and other objects of the invention will become more readily apparent from the ensuing specification taken together with the drawings.

DESCRIPTION OF THE PREFERRED EMBODIMENT

Figure 1:
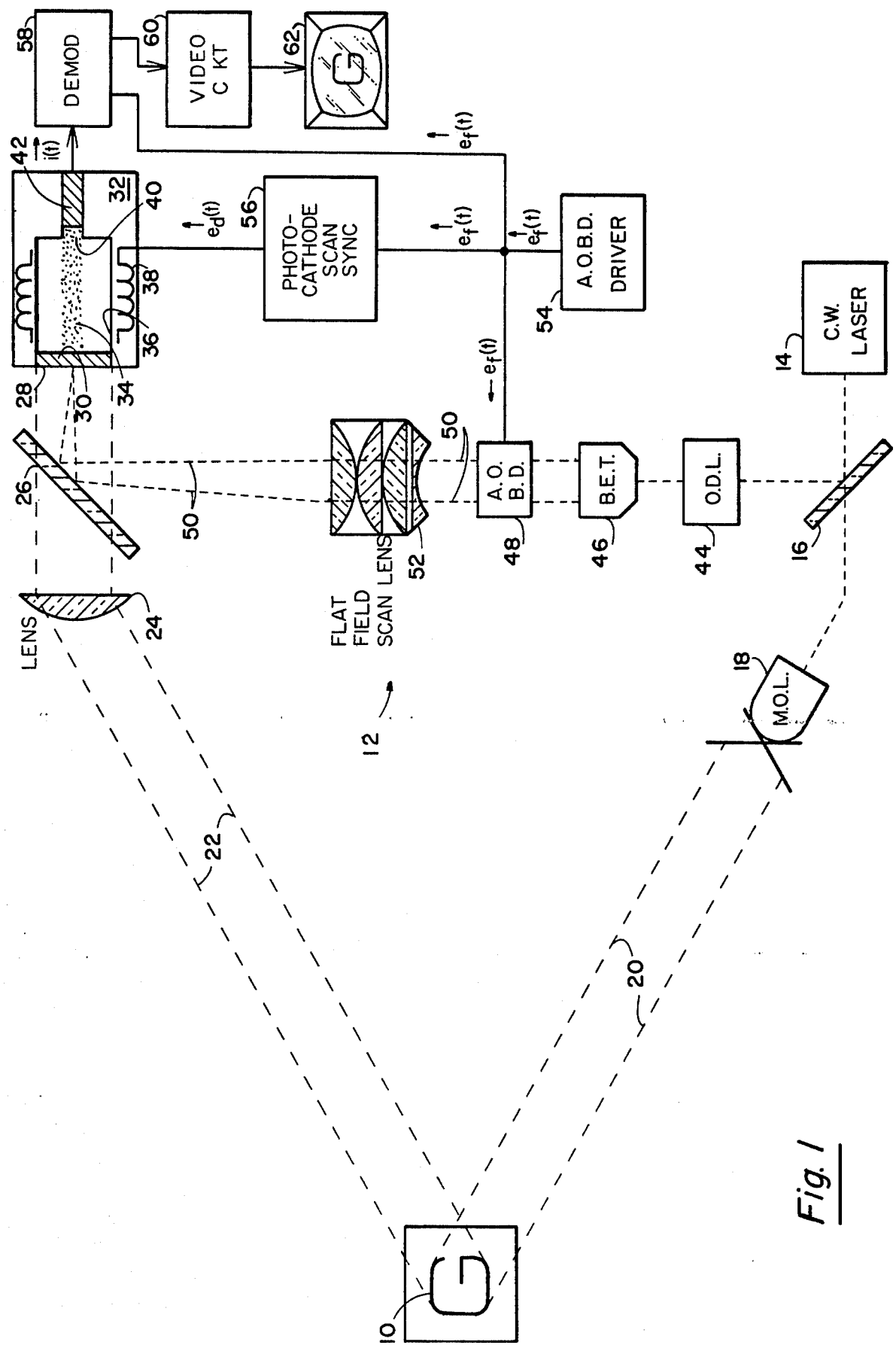
FIG. 1 is a block diagram showing an embodiment of the invention, including a means for projecting laser light toward an object to be imaged.

Referring to FIG. 1 there is shown a letter "G", representing an arbitrary object 10, which is located at some distance from optical heterodyne detection system 12. System 12 is provided with a continuous wave laser 14 which may comprise an argon laser, model 95-4, manufactured by the Lexel Corporation, to provide a source of coherent light, light from laser 14 being coupled through beam splitter 16 to microscopic objective lens 18. Lens 18 is oriented toward object 10 so that coherent light beam 20 from laser 14 is projected toward object 10 and impinges thereupon. A beam or signal of coherent light 22 is thereby caused to be reflected from object 10 back toward system 12, an image of object 10 being carried on the wavefront or field of signal 22. Laser 14 is provided with sufficient power so that light projected toward object 10 and reflected therefrom will be receivable at the location of system 12.

System 12 is provided with a lens 24, which receives coherent light beam 22 and focuses the same, through beam splitter 26, upon the detector plane 28 of photocathode 30 of image dissector 32. Image dissector 32 may comprise an apparatus well known in the field, such as the Vidisector Camera manufactured by the Aerospace/Optical Division of ITT.

As will be hereinafter described in greater detail in conjunction with FIG. 2, photocathode 30 may be considered to comprise an array of light responsive elements, each light responsive element comprising a discrete incremental section of photocathode 30. Each photocathode section or element has a light sensitive surface, comprising an incremental area of detector plane 28. In accordance with the operation of an image dissector, light impinging upon a given light responsive element causes an electron stream 34 to be projected into drift tube 36 of image dissector 32, the number of electrons in the stream being directly related to the intensity of light impinging upon the light sensitive surface of the given light responsive element.

Image dissector 32 is also provided with deflection coils 38 or other means for deflecting a stream of electrons 34 projected through drift tube 36. In response to a deflection signal $e_{d(t)}$, coils 38 deflect the stream of electrons generated by light impinging upon a given light responsive element through aperture 40 to dynode chain 42 or other electron detecting apparatus. Dynode chain 42 comprises an electron multiplier, which multiplies the number of received electrons by a given factor to generate a current i(t). Current i(t) varies with electron stream 34 and therefore, during the period that an electron stream from the given light responsive element is directed through aperture 40, current i(t) provides an electrical representation of light impinging upon the given element.

It will be readily apparent that only an electron stream having a cross section equal to or less than the dimensions of the aperture will be fully detected by electron multiplier 42. Since each light responsive element generates an electron stream having a cross section equal to the area of its light sensitive surface, each light responsive element is considered to comprise a section of photo cathode 30 having a light sensitive surface equal to the dimensions of aperture 40. By so doing, all of the light impinging upon a light responsive element will be represented in the electron stream generated thereby.

Aperture 40 may usefully be circular and have a diameter of 200 microns. Referring further to FIG. 1, there is shown light from laser 14 reflected to optical delay line 44, and coupled therefrom, through beam expanding telescope 46, to acousto-optic beam deflector 48. Optic beam deflector 48 shifts the frequency of the light of laser 14 to provide a local oscillator coherent light signal 50 having a frequency which is greater or less than the frequency of reflected coherent light signal 22. Local oscillator signal 50 is focused by flatfield scan lens 52 and reflected by beam splitter 26 so that most of the light of local oscillator 50 impinges upon detector plane 28 of photocathode 30 within an Airy disc of two microns diameter. The position of the Airy disc on detector plane 28 is determined by deflection of local oscillator signal 50 by beam deflector 48.

Optical delay line 44 is a conventional device selected to delay a wavefront of light from laser 14 by the same time which would be required for the wavefront to reach system 12 by reflection from object 10. Beam expanding telescope 46 may usefully comprise a BET 25, manufactured by JODON. Acousto-optic beam deflector 48 comprises a well-known device which has the capability of introducing the aforementioned frequency shift, and usefully comprises a device such as the Acousto-Optic Laser Beam Deflector Scanner, Model LD401, manufactured by Isomet.

In addition to providing the above frequency shifting capability, beam deflector 48 selectively deflects local oscillator signal 50, in response to an electric driving signal $e_f(t)$ coupled thereto from optic beam deflector driver 54. Driver 54, comprising conventional electronics used in conjunction with beam deflector 48, provides driving signals $e_f(t)$ that cause the two micron Airy disc of local oscillator signal 50 to be sequentially focused upon the light sensitive surface of each of the light responsive elements comprising photocathode 30. It will be readily apparent that when a given signal $e_f(t)$ causes the Airy disc of local oscillator signal 50 to be focused upon a given light responsive element, heterodyning will occur within the disc between the local oscillator signal 50 and light from reflected signal 22. The heterodyne signal resulting therefrom is represented in an electron stream 34 generated by the given light responsive element, the generated electron stream having a frequency signal to the difference in frequency between the reflected and local oscillator signal.

Referring once more to FIG. 1, there is shown photocathode scan synchronizer 56 receiving optic beam deflector driving signals $e_f(t)$ from driver 54. Synchronizer 56 may comprise a conventional circuit, such as a simple analog circuit, which, upon receiving a given signal $e_f(t)$, provides a corresponding signal $e_d(t)$. Each signal $e_d(t)$ is coupled to deflection coils 38 to provide the aforementioned deflection signal required for the operation thereof. Synchronizer 56 is structured so that when a particular signal $e_f(t)$ causes the Airy disc to be focused upon a particular light responsive element of photocathode 30, synchronizer 56 generates a signal $e_d(t)$ which causes deflection coils 38 to direct the electron stream generated by the particular light responsive element through aperture 40 to multiplier 42. Consequently, as the Airy disc of local oscillator signal 50 is sequentially focused on the light responsive elements comprising photocathode 30, the electron streams respectively generated thereby are scanned by electron multiplier 42 to provide i(t).

Alternately, synchronizer 56 could comprise a minicomputer programmed to generate signals $e_f(t)$ and $e_{d(t)}$ to cause the local oscillator Airy disc to be focused upon a particular light responsive element, while the electron stream projected by the element was directed through aperture 40 to multiplier 42. Dwell time, the time that the Airy disc is focused upon a light sensitive element, and the scan sequence would also be programmed into the minicomputer.

The image of object 10 may be considered to comprise an array of discrete picture elements, each picture element being the portion of the image which impinges upon the light sensitive surface of one of the light responsive elements of photocathode 30. Given the 200 micron area of each light sensitive surface, the light intensity of a picture element may be considered to be uniform over the light sensitive surface. When the Airy disc is focused on any part of the light sensitive surface of a light responsive element, mixing occurs between local oscillator signal 50 and the light of the picture element impinging upon the light responsive element, so that the electron stream projected into drift tube 36 by the light responsive element indicates the intensity of the picture element. Since, as aforementioned, current i(t) varies with the electron stream directed through aperture 40, the current i(t) generated by the above sequential focussing technique provides a full representation of the image of object 10. The image may be readily recovered from current i(t) by means of conventional demodulation apparatus 58, the heterodyne intermediate frequency reference required for apparatus 58 comprising beam deflector driving signals $e_{f(t)}$. The output of demodulator 58 is coupled to standard video circuitry 60 in order to display the image of object 10 on video display 62.

Figure 2:
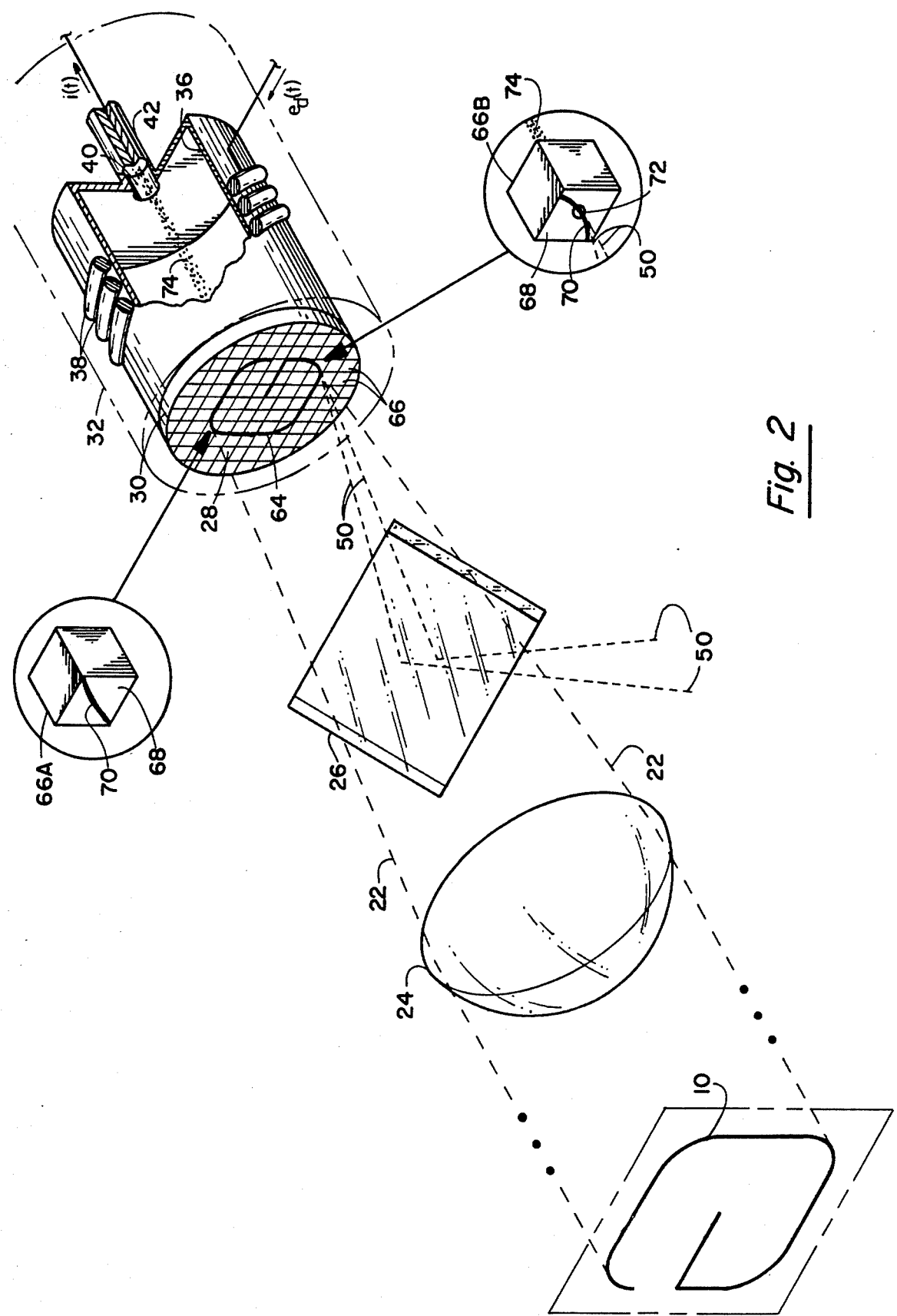
FIG. 2 is a perspective view showing an image dissector tube for the embodiment of FIG. 1 having a portion broken away.

Referring to FIG. 2, there is shown an image 64 of object 10, carried upon the wave-front of reflected coherent light signal 22, focused by lens 24 upon detector plane 28 of photocathode 30 is previously described.

A grid has been superimposed upon detector plane 28 to illustrate the array of discrete light responsive elements 66 comprising photocathode 30, such as light responsive element 66A which has been broken away from photocathode 30 for purposes of illustration. Each light responsive element 66 comprises the section of photocathode 30 from which a stream of electrons is projected through aperture 40 to multiplier 42 when a unique coil deflection signal $e_{d(t)}$ is coupled to coils 38. As aforementioned, the light sensitive surface 68 of each light responsive element 66 has an area equal to the area of aperture 40. Also as aforementioned, the light responsive elements 66 of photocathode 30 are scanned by coupling a predetermined sequence of deflection signals $e_{d(t)}$ to coils 38, whereby electron streams generated by respective light sensitive elements 66 are directed to and detected by electron multiplier 42 in the same sequence.

Referring further to FIG. 2, there is shown image 64 comprising an array of picture elements 70, each picture element being the portion of image 64 that impinges upon the surface 68 of a light responsive element 66. FIG. 2 also shows local oscillator signal 50 focused within an Airy disc 72 upon a light responsive element 66B when the electron stream 74 generated by element 66B is being directed through aperture 40 to multiplier 42 in response to a deflection signal $e_{d(t)}$.

Since, in contrast to the prior art, reflected signal 22 is not focused within an Airy disc upon detector plane 28, atmospheric or other environmental disturbances of signal 22 have no effect on the positioning of the Airy disc on plane 28. Consequently, the aforementioned problem of wander, i.e., random movement of the Airy disc upon the detector plane, is substantially reduced or eliminated. Also, it will be noted that the dimensions of the Airy disc within which local oscillator signal 50 is focused upon detector plane 28 are 1/100th of the dimensions of a picture element with which the local oscillator signal is to be mixed. A heterodyne signal which accurately represents a picture element will be generated if the disc impinges anywhere within the picture element.

While the above embodiment pertains to a system for viewing an image of an object located at a distance, it is clear that the principles of the invention may also be used in a communication system for receiving a modulating signal carried upon a transmitted coherent light signal. When a coherent light signal is modulated, the intensity of the wavefront of the coherent light signal varies with the modulating signal, but is uniform at any given time. Consequently, when a modulated coherent light signal impinges upon detector plane 28, all light responsive elements 66 receive the same light intensity at any given time, and the heterodyne signal provided by mixing local oscillator 50 with the light upon any light responsive element will provide a stream of electrons 74 representing the modulating signal.

Obviously, many modifications and variations of the present invention are possible in the light of the above teachings, and, it is therefore understood that within the scope of the disclosed inventive concept, the invention may be practiced otherwise than as specifically described.

What is claimed is:

1. Optical heterodyne apparatus for viewing the image of an arbitrary object which is carried on the wavefront of a first coherent light signal, said apparatus comprising:
   an array of light responsive elements, each of said light responsive elements having a light sensitive surface and comprising means for generating an electric signal that represents the light impinging upon its light sensitive surface;
   lens means receiving said first coherent light signal for focusing said image on said array of light responsive elements;
   means for providing second coherent light signal, the frequencies of said first and second coherent light signals being different;
   focusing means for sequentially focusing said second coherent light signal within an Airy disc upon the light sensitive surface of each of said light responsive elements, each light responsive element generating a heterodyne signal when said second coherent light signal is focused upon its light sensitive surface;
   detection means for receiving said heterodyne signals, and for generating a set of signals in response to said heterodyne signals which is capable of providing a viewable representation of said image, and
   signal exclusion means positioned between said light responsive elements and said detection means for preventing said detection means for receiving signals representing light of said first coherent light signal which are generated by any of said light responsive elenents except the light responsive element upon which said second coherent light signal is focused.

2. The apparatus of claim 1 wherein:
   said lens means comprises means receiving a first coherent light signal which is emitted from a diffusive object, said lens means for focusing an image of said diffusive object on said light responsive elements, said image comprising an array of picture elements, each of said picture elements impinging upon the light sensitive surface of a different one of said light responsive elements;
   said focusing means comprises means for focusing said second coherent light signal upon the light sensitive surface of a light responsive element within an Airy disc which is sufficiently small, in relation to the area of the light sensitive surface of the element, that said Airy disc remains upon the light sensitive surface of the element for a preselected dwell time period; and
   said apparatus further includes means receiving said set of signals generated by said detection means for providing a viewable representation of said diffusive object.

3. The apparatus of claim 2 wherein:
   said detection means comprises means for receiving the heterodyne signal of a given one of said light responsive elements when said second coherent light signal is focused upon the light sensitive surface of said given element, said heterodyne signal of said given element representing the intensity of the picture element of said image which impinges upon the light sensitive surface of said given element, said heterodyne signal of said given element having a frequency equal to the difference between the frequencies of said first and second coherent light signals.

4. The apparatus of claim 2 wherein said focusing means includes:
   optic beam deflector means receiving said second coherent light signal for sequentially focusing said second coherent light signal within an Airy disc upon the light sensitive surface of each of said light responsive elements.

5. The apparatus of claim 2 wherein:
   each of said light responsive elements comprises an incremental section of a photocathode joined to a drift tube, the light sensitive surface of a light responsive element comprising an incremental section of the detector plane of the photocathode, and each light responsive element projecting a stream of electrons into said drift tube which represents the intensity of light impinging upon its light sensitive surface.

6. The apparatus of claim 5 wherein said signal exclusion means comprises:
   barrier means positioned in said drift tube between said photocathode and said detection means, said barrier means being provided with an aperture, said aperture having a size which is equal to the area of the light sensitive surfaces of said light responsive elements; and
   means for directing a different one of said electron streams through said aperture to said detecting means during each dwell time period in a succession of dwell time periods.

7. The apparatus of claim 6 wherein:
   said system includes means coupled to said focusing means and to said directing means for operating said directing means to direct the electron stream projected by a given light responsive element through said aperture when said second coherent light signal is focused within said Airy disc upon the light sensitive surface of said given light responsive element, the electron stream of said given light responsive element including a heterodyne component which represents the intensity of the picture element of said image that impinges upon the light sensitive surface of said given element, said component having a frequency equal to the difference between the frequencies of said first and second coherent light signals.

8. The apparatus of claim 7 wherein:
   the dimensions of said aperture are substantially greater than the dimensions of said Airy disc.

9. The apparatus of claim 8 wherein:
   said aperture has a diameter of approximately 200 microns, and said Airy disc has a diameter of approximately 2 microns.

10. The apparatus of claim 6 wherein:
    each of said electron streams comprises an electric signal having a bandwidth of approximately 40 MHz.

11. The apparatus of claim 2 wherein:
    said apparatus includes means for projecting coherent light of a selected frequency upon a diffusive object so that some of said projected light is reflected by said diffusive object back toward said apparatus, said reflected light comprising said first coherent light signal.

12. The apparatus of claim 11 wherein:
    said means for projecting coherent light comprises a continuous wave laser source;
    said means for providing said second coherent light beam comprises an optical frequency shifting means receiving light from said continuous wave laser source; and
    said means for providing a viewable representation of said diffusive object comprises video display apparatus.

13. A method for viewing a diffusive object which emits a first coherent light beam, an image of said diffusive object being contained in the field of said first coherent light beam, said method comprising the steps of:
    focusing said first coherent light beam on an array of light responsive elements, each of said light responsive elements generating an electric signal which represents the light impinging upon it;
    providing a second coherent light signal, the frequencies of said first and second coherent light signals being different;
    sequentially focusing said second coherent light signal on each of said light responsive elements within an Airy disc to generate a sequence of heterodyne signals, each of said heterodyne signals having a frequency equal to the difference between said first and second coherent light signals, a given one of said heterodyne signals representing the intensity of a portion of said image that impinges upon a given one of said light responsive elements;
    sequentially receiving said heterodyne signals to provide a viewable representation of said diffusive object; and
    preventing the detection of an electric signal representing light of said first coherent light signal which is generated by one of said light responsive elements upon which said second coherent light signal is not focused.

14. The method of claim 13 wherein:
    said step of focusing said first coherent light beam comprises the step of focusing said first coherent light beam on an array of light responsive elements which comprises discrete incremental sections of a photodetector, each of said discrete sections generating an electron stream which represents the light impinging upon it, each of said incremental sections including an incremental area of the detector plane of said photodetector;
    said step of focusing said second coherent light signal comprises the step of sequentially focusing said second coherent light signal on each of said incremental areas of said detector plane within an Airy disc, the dimensions of said Airy disc being substantially less than the dimensions of said incremental areas; and
    said method includes the step of directing the electron stream generated by a given one of said incremental sections through an aperture when said second coherent light signal is focused on the incremental area of said given incremental section, the dimensions of said aperture being equal to the dimensions of said incremental area.

15. The method of claim 14 wherein said method includes the steps of:
    generating a coherent light signal of selected frequency;
    projecting part of said generated signal on said object so that a portion of said projected signal is reflected, said reflected portion comprising said first coherent light signal; and
    shifting the frequency of another part of said generated coherent light signal to provide said second coherent light signal.

* * * * *